United States Patent [19]

Phillips et al.

[11] Patent Number: 4,952,447

[45] Date of Patent: Aug. 28, 1990

[54] BARRIER LAYER IN BETWEEN POLYURETHANE FOAM AND VINYL SKIN

[75] Inventors: John A. Phillips, Wales; Ernest E. McClellan, Delafield; Robert C. Rock, Watertown, all of Wis.

[73] Assignee: Plastomeric, Inc., Waukesha, Wis.

[21] Appl. No.: 263,765

[22] Filed: Oct. 28, 1988

[51] Int. Cl.$^5$ ............................................... B32B 3/26
[52] U.S. Cl. ............................... 428/318.6; 428/319.3; 428/319.7
[58] Field of Search ............... 428/319.1, 319.7, 318.4, 428/318.6, 319.3

[56] References Cited

U.S. PATENT DOCUMENTS 4,278,629  7/1981  Bennett ............................ 428/319.7

FOREIGN PATENT DOCUMENTS 3517226  11/1985  Fed. Rep. of Germany ... 428/319.1

Primary Examiner—William J. Van Balen
Attorney, Agent, or Firm—Foley & Lardner, Schwartz, Jeffery, Schwaab, Mack, Blumenthal & Evans

[57] ABSTRACT

A vinyl-skin-covered polyurethane-foamed article is disclosed, comprising a polyurethane foam core, a vinyl skin covering the polyurethane foam core, and a barrier layer between the polyurethane foam core and the vinyl skin that reduces the migration of polyurethane foam components into the vinyl skin and reduces the migration of vinyl skin components into the polyurethane foam core. In a particularly preferred embodiment the barrier layer comprises cellulose acetate or cellulose acetate butyrate. The barrier layer reduces or eliminates the action of vinyl skin components on polyurethane foam and the action of polyurethane foam components on vinyl skin without degrading the physical properties of either the vinyl skin or the foam.

13 Claims, No Drawings

4,952,447

BARRIER LAYER IN BETWEEN POLYURETHANE FOAM AND VINYL SKIN

BACKGROUND OF THE INVENTION

The present invention relates to polyurethane foamed articles covered with a vinyl skin. More particularly, the invention relates to such an article having a barrier layer between the polyurethane foam and the vinyl skin that reduces migration of components of the polyurethane foam into the vinyl skin and also reduces migration of components from the vinyl skin into the polyurethane foam.

Polyurethane foams covered with vinyl skins have a wide range of applications. In particular, they are used for automotive interior components such as cushions, arm rests, head rests, instrument panels and consoles. When used for automotive interiors, the articles are exposed to extreme environmental conditions. For example, it is not uncommon for automotive interiors to reach temperatures of 140° C. automotive interior is subjected cause the vinyl skin of the foamed components to discolor and harden and the polyurethane foam to degrade and become brittle.

Various solutions to the degradation of these components have been proposed. For example, by using a thicker vinyl skin the discoloration of the outer portion of the skin is reduced. However, this results in a cost disadvantage.

Another proposed solution has been to change the amine catalysts used in the polyurethane foam. For example, catalysts reactive with the isocyanate component and catalysts with a high molecular weight that reduces bleeding speed have been proposed. However, while the catalysts reduce the adverse effects on the vinyl skin, they do not solve the problem of adverse effects of vinyl skin components on the polyurethane foam.

SUMMARY OF THE INVENTION

It is therefore an object of the present invention to provide in a vinyl-skin-covered polyurethane-foamed article a single means of reducing or eliminating the action of vinyl skin components on polyurethane foam and the action of polyurethane foam components on vinyl skin.

It is a further object of the invention to provide a means for reducing or eliminating the action of vinyl skin components on polyurethane foam and the action of polyurethane foam components on vinyl skin without degrading the physical properties of either the vinyl skin or the foam.

It is yet another object of the invention to provide a low-cost means for reducing or eliminating the action of vinyl skin components on polyurethane foam and the action of polyurethane foam components on vinyl skin in vinyl-skin-covered polyurethanefoamed articles.

These and other objects of the invention are achieved by a vinyl-skin-covered polyurethane-foamed article, comprising a polyurethane foam core, a vinyl skin covering the polyurethane foam core, and a barrier layer between the polyurethane foam core and the vinyl skin that reduces the migration of polyurethane foam components into the vinyl skin and reduces the migration of vinyl skin components into the polyurethane foam core. In a particularly preferred embodiment the barrier layer comprises cellulose acetate or cellulose acetate butyrate.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Polyurethane foamed articles comprise a polyurethane foam core covered with a vinyl skin. Polyurethane foam cores are prepared by methods well-known in the art, generally by reaction of organic polyisocyanates with a polyol in the presence of an amine catalyst. Blowing agents, surfactants, and adhesion promoters may also be included in the reaction mixture.

The catalysts used in producing the foam remain in the finished product. If the amine compounds migrate into the vinyl skin in the final product, they can react with the polyvinylchloride to discolor and harden the skin. Similarly, if halogen compounds are included in the foam as fire retardants, these may also migrate into the vinyl skin.

Vinyl skins used on the polyurethane foamed articles are also well-known in the art. They typically comprise a homopolymer or copolymer of polyvinylchloride, with pigments and ingredients to impart flexibility and resistance to heat and light. A typical formulation of a vinyl skin is:

| | |
|---|---|
| polyvinylchloride resin | 59.0% |
| di-isodecyl phthalate plasticizer | 35.7% |
| epoxidized soybean oil | 3.0% |
| barium, cadmium, zinc organic complex stabilizer | 2.0% |
| carbon black pigment | 0.2% |

Other polymers are sometimes included in the vinyl skins, such as polymers comprising one or more of acrylonitrile, butadiene and styrene, and acrylicbased polymers. For purposes of the present invention, "vinyl skin" refers to skins consisting essentially of polyvinylchloride, with or without other conventionally-added polymers or modifying ingredients. The vinyl skin can be the outermost surface of the composite structure, or it may be coated with a pigmented top coat and/or clear coat.

Vinyl skins usually contain a phthalate ester as a plasticizer. For example, in the formulation above, di-isodecyl phthalate plasticizer was used. Just as the amine catalyst can migrate from the foam core into the vinyl skin, the vinyl plasticizer can migrate from the vinyl skin into the foam core. The plasticizer adversely affects the polyurethane foam by causing discoloration and embrittlement.

According to the present invention, a barrier layer is provided between the foam core and the vinyl skin to reduce migration of polyurethane foam components into the vinyl skin and migration of vinyl skin components into the polyurethane foam core. This reduces the discoloration and hardening of the vinyl skin and the discoloration and embrittlement of the foam core. The barrier layer need not contact either the polyurethane foam or the vinyl skin in order to reduce migration of the components. In other words, additional layers can be present, so long as they do not interfere with the barrier layer. For example, a primer layer might be used to improve the adhesion of the barrier layer to the vinyl. Adherence to adjacent surfaces will maintain the composite structure. A barrier layer that can shift with respect to both the core and the vinyl skin can allow migration of components if it shifts out of position during use. For this reason, it is preferred that the barrier layer be adhered directly or indirectly (by means of an intermediate layer or layers) to either the foam core or the vinyl skin, preferably to the vinyl skin.

An ideal barrier layer will have certain properties in addition to reducing the migration of components. For example, it will be capable of coating complex shapes in a production sequence. Additionally, it will remain flexible during use of the product.

The barrier layer comprises a continuous layer that retards migration of both the vinyl plasticizer and the amine catalysts. The layer must not have any pores or openings large enough to permit passage of the molecules of plasticizer or amine catalyst.

An example of a suitable barrier layer is a metallic film, especially aluminum foil. However, in actual practice, aluminum foil is less preferred because it may shift during use, allowing migration to occur. It is also difficult to use in a production sequence.

More preferably, the barrier layer comprises a layer of a substance that can be applied by spraying or casting. This mode of application is much preferred from a manufacturing standpoint. Moreover, a barrier that adheres to the vinyl layer can be used. This prevents any shifting of the barrier layer. It is thought that the layer retards migration as a result of its permeability to plasticizer and/or amine catalysts. Possible factors influencing this permeability of the barrier layer to the components may include solubility effects and short range intermolecular effects, e.g., effects based on the size, orientation and electronegativity of various groups on the material of the barrier layer.

In order to assess the potential utility of various sprayable or castable materials as barrier layers, the material was tested for its solubility in plasticizer (DIDP) when maintained at 250° F. for 48 hours (the plasticizer test of Table 1). The viscosities reported in Table 1 are those measured at the conclusion of the test. The viscosity of DIDP alone is 75 cps. If the viscosity is unchanged at the end of the test, it is assumed that the barrier material has not dissolved appreciably in the plasticizer.

The material was also monitored for any change in physical form. It was found that materials which changed physical form during the test, especially by gelling or melting and to a lesser extent by swelling, were less effective as barrier layers. It is thought that the change in physical form indicates that an effective barrier will not be maintained, even though solubility in plasticizer is low. By changing physical state, such as by melting, the layer may become more permeable to the components. In other cases, the change in physical form may actually produce observable discontinuities in the film.

Table 1 also reports the film properties of a layer of the potential barrier material, both its actual barrier properties and its adhesion to PVC. The results are summarized in Table 1.

TABLE 1

| Polymer | Plasticizer Test u(cps)/physical form | Film Properties barrier/adhesion |
|---|---|---|
| acrylic resin (low mol. wt.) | 90/melted solid | moderate/good |
| acrylic resin (hi mol. wt.) | 75/swelled | moderate/good |
| acrylic resin (thermoset) | 90/dissolved solid | only tested in combination with other polymers |
| pvc | gel/gel | * |
| ethylene vinyl alcohol copolymer | 180/gelled solid | * |
| polyvinyl alcohol | 75/solid | substantial/poor |
| cellulose acetate burtyrate (CAB171-15S-Eastman) | 75/wetted powder | substantial/poor |
| cellulose acetate butyrate (CAB553-0.4-Eastman) | 80/gelled solid | slight/moderate |
| cellulose acetate butyrate (CAB381-20 Eastman) | 160/gelled liquid | slight/moderate |
| cellulose acetate butyrate (CAB381-2-Eastman) | 700/gelled liquid | slight/moderate |
| cellulose acetate | 75/wetted powder | substantial/poor |
| cellulose acetate propionate | 75/wetted powder | substantial/poor |
| polyester (Newark 72) | 75/melted solid | none/poor |
| polyester (Newark 4709) | 75/wetted powder | substantial/good |
| polyester (Hytrel 4056) | 100/gelled powder | * |
| polyester (Vitel PE 200) | 80/melted solid | slight/good |
| nitrile (P8B1D2) | 150/gelled powder | * |
| nitrile (Hycar 1001 LG) | 100/swelled powder | only tested in combination with other polymers |
| urethane | 80/melted solid | slight/good |
| urethane | 200/gel | * |
| polyamide | 75/solid pellet | slight/poor |

*film properties not measured because of change in physical form after plasticizer test It is apparent that not only the chemical composition of the material, but also its physical form plays a role in its effectiveness as a barrier layer. In particular, if the material melts or gels when exposed to plasticizer at elevated temperatures, it is typically not a good candidate for use as a barrier layer. It is hypothesized that the change in physical form on exposure to plasticizer at elevated temperatures causes a loss of film continuity.

Furthermore, it is clear that some materials that have excellent barrier characteristics suffer in terms of adhesion to vinyl. Adhesion can be improved by using a material having excellent barrier properties (e.g., the cellulose acetate series) in combination with a material that has good adhesion to vinyl (e.g., acrylic).

Suitable materials that have been found to provide barrier properties and reduce the degradation of vinyl-skin-covered polyurethane-foamed articles include cellulose acetate butyrate, cellulose acetate, polyvinyl alcohol, cellulose acetate propionate, polyvinylidene chloride, urethane, polyester, polyamide, acrylic, epoxy, shellac, and ethylene vinyl alcohol. In aging tests, these materials reduced the degradation of both the vinyl skin and the polyurethane foam core.

More preferably, the barrier layer material is selected from the group consisting of cellulose acetate butyrate, cellulose acetate, polyvinyl alcohol, cellulose acetate propionate, polyvinylidene chloride, urethane, polyester and polyamide. Aging tests comparing articles having a barrier layer of these materials with articles having no barrier layer showed reductions in darkening of the vinyl skin from a DE of 12 for the controls to a DE of less than 6 for articles containing the barrier layer and reductions in hardening of the vinyl skin from a Shore A hardness of 100 for the controls to a Shore A hardness of less than 90 for articles containing the barrier layer. Similarly, although the polyurethane foam of the control became black and brittle, the foam of articles with these barrier layers exhibited only a slight color change and remained flexible.

Even more preferably, the barrier layer according to the invention comprises polyvinyl alcohol or cellulose acetate or cellulose acetate esterified with an additional carboxylic acid, more particularly it comprises cellulose acetate, cellulose acetate butyrate, cellulose acetate propionate and polyvinyl alcohol. These compounds reduce the DE value to 5 or less. Especially preferred are cellulose acetate and cellulose acetate butyrate. When either cellulose acetate or cellulose acetate butyrate is used as the barrier layer, darkening of the vinyl skin is further reduced; a DE value of 3 is typically obtained.

The vinyl-skinned polyurethane-foamed article with barrier layer can be formed in a variety of ways. The preferred method of application is by spraying. Alternatively, the barrier layer could be cast from solution onto the vinyl skin. The concentration of barrier material in the solution to be sprayed or cast is selected so that the barrier material forms a continuous film that maintains its integrity at high temperatures. It is preferred if the solvent chosen for application attacks the vinyl slightly, since this improves adhesion of the barrier layer to the vinyl.

For purposes of the present invention, concentrations of barrier material in solvent are selected so that the material can be sprayed or cast evenly. Amounts of material ranging from about 5 to 20% by weight of the solution are typically suitable. If a lower concentration of barrier material is used, more solution is sprayed or cast to obtain a thickness of barrier material that will retard migration of components. However, if the amount of barrier material in the solution is too low, it will tend to form a film that is deficient in barrier properties. Higher amounts of barrier material can be used so long as the flow properties of the solution are not adversely affected. However, because of the cost disadvantage, higher amounts of barrier material are generally not incorporated. When cellulose acetate or cellulose acetate butyrate are used, amounts ranging from about 5 to 10% by weight have been found to produce good films with the desired barrier properties.

Alternatively, a film of the barrier material can be preformed on release paper, peeled from the release paper, and then laminated or plied to the vinyl skin. In other cases, the barrier material can be hot melted onto the vinyl skin. The method used will depend to some extent on the barrier material.

As discussed above, the barrier layer must be thick enough to retard migration of components. It has been found that a suitable thickness can be determined visually if a pigment is incorporated into the material to be sprayed or cast. For example, the following formulation can be used:

| | |
|---|---|
| Cellulose Acetate Butyrate (CAB 171-15S Eastman Chemical) | 32 pbw |
| Acrylic Resin in solution (A 101 Rohm and Haas) | 7.5 pbw |
| Diacetone alcohol | 550 pbw |
| $TiO_2$ pigment dispersed in A 101 | 10 pbw |
| Dythal (Dibasic lead phthalate stabilizer - Anzon, Inc.) | 1.5 pbw |

The solution is sprayed until a continuous white barrier layer is formed.

The following examples are provided to illustrate the present invention. The composition of the barrier layer is as follows:

| | |
|---|---|
| Example 1. | Vinyl skin plied with aluminum foil. |
| Example 2. | Vinyl skin coated with barrier coated from 5% cellulose acetate in methyl ethyl ketone (MEK). |
| Example 3. | Vinyl skin coated with barrier coated from 5% cellulose acetate butyrate in MEK. |
| Example 4. | Vinyl skin coated with barrier coated from 5% cellulose acetate butyrate, 1% acrylic resin, 74% MEK, 15% THF. |
| Example 5. | Vinyl skin coated with barrier coated from 5% polyvinyl alcohol in water. |
| Example 6. | Vinyl skin coated with barrier coated from 8.2% cellulose acetate butyrate, 1.4% butadiene/acrylonitrile, 90.4% MEK. |
| Example 7. | Vinyl skin coated with barrier coated from 5% cellulose acetate propionate in MEK. |
| Example 8. | Vinyl skin coated with barrier coated from 5% polyvinylidene chloride in MEK. |
| Example 9. | Vinyl skin coated with barrier coated from 5% urethane in MEK. |
| Example 10. | Vinyl skin coated with barrier hot melted from polyamide resin. |
| Example 11. | Vinyl skin coated with barrier hot melted from polyester resin. |
| Example 12. | Vinyl skin coated with barrier cast from 4% polyvinyl alcohol, 11% thermoset acrylic resin, 2% epoxy resin, and 83% water. |
| Example 13. | Vinyl skin coated with barrier cast from 5% acrylic resin in MEK. |
| Example 14. | Vinyl skin coated with barrier made by spraying with a commercially-available shellac spray. |
| Example 15. | Vinyl skin coated with barrier made by spraying with a commercially-available epoxy spray. |
| Example 16. | Vinyl skin coated with barrier cast from 5% ethylene vinyl alcohol in dimethylsulfoxide. |

The vinyl skin with the barrier layer was then placed on the polyurethane foam and each sample was subjected to accelerated aging by placing it in a 120° C. oven for 500 hours. A control composite (polyurethane foam and vinyl skin without any barrier) was also aged. Hardness was measured using a Shore A durometer. The test is performed in accordance with ASTM D-2240. The scale is from 0 to 100, with 100 being the hardest reading. DE is a numerical composite (L*a*b, YxY or LCH) difference from one color to another. The higher the number the greater the color change. The vinyl skin of a composite before aging has a Shore A hardness of 83 and a color of tan, DE=0. The results are shown in Table 2.

TABLE 2

| Example # | Vinyl skin properties | | Foam properties |
|---|---|---|---|
| | color (DE) | hardness (Shore A) | color change/ flexibility |
| control | 12 | 100 | black/ brittle |
| 1 | 3 | 89 | slight/ flexible |
| 2 | 3 | 90 | slight/ flexible |
| 3 | 3 | 89 | slight/ flexible |
| 4 | 3 | 89 | slight/ flexible |
| 5 | 4 | 88 | slight/ flexible |
| 6 | 5 | 87 | slight/ flexible |
| 7 | 5 | 87 | slight/ flexible |
| 8 | 6 | 87 | slight/ flexible |
| 9 | 6 | 87 | slight/ flexible |
| 10 | 6 | 88 | slight/ flexible |
| 11 | 6 | 90 | slight/ flexible |
| 12 | 7 | 93 | spotty black/ slight embrittlement |
| 13 | 9 | 98 | black/ brittle |
| 14 | 10 | 93 | spotty black/ slight embrittlement |
| 15 | 10 | 95 | black/ brittle |
| 16 | 11 | 92 | spotty black/ slight embrittlement |

As seen in Table 2, the barrier layer of aluminum foil (Example 1) and the barrier layers comprising cellulose acetate or cellulose acetate butyrate (Example 2-5) are the most effective barriers against migration of components in both directions. The latter have an advantage over aluminum foil in terms of coating complex shapes in a production sequence and in adhering to the vinyl.

The cellulose acetate butyrate in combination with butadiene/acrylonitrile, the cellulose acetate propionate, and the polyvinyl alcohol (Examples 5-7) also retard the migration of the vinyl plasticizer into the foam, and are only slightly less effective as barrier layers for retarding the migration of the amines into the vinyl than are the cellulose acetate and cellulose acetate butyrate alone. The PVC, urethane, polyamide and polyester barrier layers (Examples 8-11) retard the migration of the vinyl plasticizer into the foam, and are only slightly less effective as barrier layers retarding the migration of the amines into the vinyl than the barrier layers of Examples 5-7.

The remaining barrier layers (Examples 12-16) are less effective as barriers in both directions than the more preferred embodiments of Examples 1-11, but still provide a significant improvement over the control, especially in terms of vinyl skin properties.

Furthermore, by comparison with Table 1, it is apparent that solubility in plasticizer and changes in physical form provide a way of assessing or predicting the effectiveness of a material as a barrier layer.

What is claimed is:

1. A vinyl-skin-covered polyurethane-foamed article, comprising:
   a polyurethane foam core;
   a vinyl skin covering the polyurethane foam core; and
   a continuous barrier layer between the polyurethane foam core and the vinyl skin that is incompatible with vinyl skin components and polyurethane foam components and that reduces the migration of polyurethane foam components into the vinyl skin and reduces the migration of vinyl skin components into the polyurethane foam core, said barrier layer comprising at least one member selected from the group consisting of cellulose acetate butyrate, cellulose acetate, polyvinyl alcohol, cellulose acetate propionate, polyvinylidene chloride, urethane, polyeseter, polyamide, acrylic, epoxy, shellac, ethylene vinyl alcohol.

2. An article as claimed in claim 1, wherein the barrier layer comprises at least one member selected from the group consisting of cellulose acetate butyrate, cellulose acetate, cellulose acetate propionate, polyvinyl alcohol, polyvinylidene chloride, urethane, polyester and polyamide.

3. An article as claimed in claim 1, wherein the barrier layer comprises cellulose acetate or cellulose acetate esterified with an additional carboxylic acid.

4. An article as claimed in claim 1, wherein the barrier layer comprises at least one member selected from the group consisting of cellulose acetate, cellulose acetate butyrate, polyvinyl alcohol and cellulose acetate propionate.

5. An article as claimed in claim 1, wherein the barrier layer comprises at least one member selected from the group consisting of cellulose acetate and cellulose acetate butyrate.

6. An article as claimed in claim 1, wherein the barrier layer is cast from a solution comprising from about 5 to 20% of the recited barrier layer component.

7. An article as claimed in claim 3, comprising from about 5 to 10% of the recited barrier layer component.

8. An article as claimed in claim 5, comprising from about 5 to 10% of the recited barrier layer component.

9. An article as claimed in claim 1, consisting essentially of the recited components.

10. An article as claimed in claim 1, wherein the article is an automotive interior component.

11. An article as claimed in claim 1, wherein the barrier layer material is essentially insoluble in plasticizer and does not change physical form on contact with plasticizer.

12. An article as claimed in claim 1, wherein the barrier layer is cast from a solution of the barrier layer in a solvent that attacks the vinyl chloride.

13. An article as claimed in claim 1, wherein the barrier layer is cast from a solution of the barrier layer in an organic solvent.

* * * * *